(12) United States Patent
Inagaki et al.

(10) Patent No.: US 7,219,146 B2
(45) Date of Patent: May 15, 2007

(54) NETWORK SYSTEM, NETWORK OPERATION METHOD, AGENT MODULE, TERMINAL DEVICE, AND INFORMATION RECORDING MEDIUM AND PROGRAM THEREFOR

(75) Inventors: Katsutoshi Inagaki, Saitama (JP); Tsutomu Takahashi, Saitama (JP); Akihiro Tozaki, Saitama (JP); Masao Higuchi, Saitama (JP); Ryuichi Morioka, Saitama (JP)

(73) Assignee: Pioneer Corporation, Tokyo (JP)

( * ) Notice: Subject to any disclaimer, the term of this patent is extended or adjusted under 35 U.S.C. 154(b) by 695 days.

(21) Appl. No.: 10/067,517

(22) Filed: Feb. 7, 2002

(65) Prior Publication Data
US 2002/0116446 A1  Aug. 22, 2002

(30) Foreign Application Priority Data
Feb. 8, 2001  (JP)  ............................ P2001-032639

(51) Int. Cl.
*G06F 15/173* (2006.01)
*G06F 15/16* (2006.01)

(52) U.S. Cl. ...................... 709/224; 709/223; 709/202; 709/237; 709/217; 709/219

(58) Field of Classification Search ................ 709/212, 709/213, 223, 229, 236, 238, 202, 224, 225; 370/248, 395.2
See application file for complete search history.

(56) References Cited

U.S. PATENT DOCUMENTS

| | | | | |
|---|---|---|---|---|
| 5,862,328 A * | 1/1999 | Colyer | ........................ | 709/203 |
| 6,049,821 A * | 4/2000 | Theriault et al. | ........... | 709/203 |
| 6,098,106 A * | 8/2000 | Philyaw et al. | ............. | 709/238 |
| 6,253,234 B1 * | 6/2001 | Hunt et al. | .................. | 709/213 |
| 6,275,939 B1 * | 8/2001 | Garrison | ...................... | 713/200 |
| 6,288,716 B1 * | 9/2001 | Humpleman et al. | ....... | 715/733 |
| 6,292,904 B1 * | 9/2001 | Broomhall et al. | ............ | 714/1 |
| 6,349,336 B1 * | 2/2002 | Sit et al. | ...................... | 709/227 |
| 6,370,576 B1 * | 4/2002 | Huang | ......................... | 709/224 |
| 6,393,475 B1 * | 5/2002 | Leong et al. | ................ | 709/223 |
| 6,397,259 B1 * | 5/2002 | Lincke et al. | ................ | 709/236 |
| 6,523,696 B1 * | 2/2003 | Saito et al. | .................. | 709/223 |
| 6,609,154 B1 * | 8/2003 | Fuh et al. | .................... | 709/225 |
| 6,636,596 B1 * | 10/2003 | Gallant et al. | ......... | 379/220.01 |

(Continued)

FOREIGN PATENT DOCUMENTS

EP   0943992 A2   9/1999

(Continued)

*Primary Examiner*—Bunjob Jaroenchonwanit
*Assistant Examiner*—Kenny Lin
(74) *Attorney, Agent, or Firm*—Sughrue Mion, PLLC

(57) ABSTRACT

In a network system S, which includes an agent server LS that is located between the Internet IN and a terminal T and that relays a connection request from the terminal T to the Internet IN, the agent server LS requests the establishment of a connection between the terminal T and the agent server LS and transmits to the terminal T a request signal that includes identification information for the agent server LS. The terminal T receives the request signal and examines the agent server LS based on the identification information included in the received signal. When it is concluded that the agent server LS that transmitted the request signal is one to which the terminal T should be connected, a connection is established with the agent module LS that transmitted the request signal.

20 Claims, 10 Drawing Sheets

U.S. PATENT DOCUMENTS

| | | | |
|---|---|---|---|
| 6,735,619 B1* | 5/2004 | Sawada | 709/212 |
| 6,757,733 B2* | 6/2004 | Gupta | 709/229 |
| 6,870,848 B1* | 3/2005 | Prokop | 370/395.2 |
| 6,894,981 B1* | 5/2005 | Coile et al. | 370/248 |
| 2002/0107910 A1* | 8/2002 | Zhao | 709/203 |

FOREIGN PATENT DOCUMENTS

| | | |
|---|---|---|
| WO | WO 97/09800 A2 | 3/1997 |
| WO | WO 00/65774 | 11/2000 |

* cited by examiner

NETWORK SYSTEM, NETWORK OPERATION METHOD, AGENT MODULE, TERMINAL DEVICE, AND INFORMATION RECORDING MEDIUM AND PROGRAM THEREFOR

BACKGROUND OF THE INVENTION

1. Field of the Invention

The present invention relates to technical fields for a network system, a network operation method, an agent module, a terminal device, and a information recording medium and a program therefor. More particularly, the present invention relates to technical fields for a network system for transmitting information between an agent module and a terminal device and an operation system therefor and for an information recording medium for operating the agent module, the terminal device, and the network system and program therefor.

2. Description of the Related Art

It has recently become common practice for information processing apparatuses to exchange information therebetween via networks, such as the Internet, to which the information processing apparatuses are connected. In order for a terminal device, including a personal computer installed in an ordinary home, to be connected to a network, a connection is first established between the terminal device and an agent device disposed in an agent, such as an Internet Service Provider and then the terminal device is further connected to a network via the agent device.

In this case, according to the related art, in order to establish connection between the agent device and the terminal device, an terminal device side first attempts connection to the agent device (attempt so called dial-up), and whereby connection including the network, the agent device, and the terminal device are established.

However, according to the above connection establishing method, a terminal device is neither connected to an agent device, nor to a network, so long as the terminal device does not attempt to establish the connection via an agent device positively. Therefore, when the operator of the terminal device is not present at the location where the terminal device is installed, it is not possible for the terminal device to connect to the agent device nor to the network to enable the terminal device to perform various processes.

The invention has been made to solve the above problems. It is an objective of the present invention to provide a network system that enables an agent device to control a terminal device and an information processing apparatus connected thereto, even when no operator is present at a place where the terminal device is installed, an operating method therefor, and an program for operating the agent device, the terminal device, and the network system and an information recording medium in which the program is recorded.

SUMMARY OF THE INVENTION

To achieve this objective, according to a first aspect of the invention, there is provided a network system comprising:
a terminal device; and
an agent module disposed between a network and the terminal device, for relaying an access from the terminal device to the network,
wherein the agent module such as a management server includes a request signal transmission section for transmitting to the terminal device a request signal requesting to establish an information transmission enabled state between the terminal device and the agent module, the request signal including identification information to identify the agent module; and
the terminal device includes:
a reception section for receiving the transmitted request signal,
a first determination section such as a CPU for determining whether the agent module which has transmitted the request signal is an agent module to which the terminal device receiving the request signal is to be connected; and
an establishment section such as a CPU for establishing the information transmission enabled state between the terminal device receiving the request signal and the agent module which has transmitted the request signal, when the first determination section ascertains that the agent module which has transmitted the request signal is the agent module to which the terminal device receiving the request signal is to be connected.

According to this arrangement, when the agent module transmits the request signal to the terminal device and the terminal device ascertains that this agent module is one to which the terminal device to be connected, the information transmission enabled state is established between the terminal device and the agent module that transmitted the request signal. Therefore, even when no operator is present at the terminal device, information can be transmitted between the terminal device and an information processing apparatus connected thereto.

Further, according to a second aspect of the invention, there is provided the network system according to the first aspect of the invention,
wherein the agent module includes:
an identification section such as a management server for identifying whether another terminal device other than the terminal device is another authorized terminal device that is to be connected to the agent module, when the another terminal device issues to the network a request for a connection to the terminal device to be connected to the network through the agent module;
a connection section such as a management server for connecting the terminal device and the another terminal device after the information transmission enabled state is established between the agent module and the terminal device; and
when the identification section ascertains that the another terminal device is the another authorized terminal device to be connected to the agent module, the request transmission section outputs the request signal to the terminal device to establish the information transmission enabled state.

According to this arrangement, when the another terminal device other than the terminal device that is connected to the agent module issues a connection request to the terminal device, the connection to the terminal device is established through the agent module. Therefore, even when no operator is present at the terminal device connected to the agent module, information can be transmitted between the another terminal device and the terminal device connected to the agent module.

According to a third aspect of the invention, there is provided the network system according to the second aspect of the invention,
wherein the another terminal device is used to remotely control information processing apparatus connected to the terminal device; and when the another terminal device and the terminal device are connected by the connection section, the another terminal device performs a processing for the remote control.

With this arrangement, when the another terminal device is connected through the agent module to the terminal device connected to the agent module, the another terminal device performs a process for the remote control of the terminal device connected to the agent module. Therefore, even when no operator is present at the terminal device connected to the agent module, the another terminal can remotely control the information processing apparatus connected to the terminal device that is connected in turn to the agent module.

According to a fourth aspect of the invention, there is provided the network system according to the third aspect of the invention, wherein the information processing apparatus is information recording apparatus for recording information in a recording medium; and the another terminal device performs the remote control to set at least a time from which the information recording apparatus starts a process for recording the information.

With this arrangement, the another terminal device performs the remote control to set at least set a time from which the information recording apparatus starts a process for recording the information. Therefore, even when no operator is present at the terminal device connected to the agent module, the another terminal device remotely controls the recording process in the information processing apparatus connected to the terminal device that is connected in turn to the agent module.

According to a fifth aspect of the invention, there is provided the network system according to the first aspect of the invention, wherein the agent module includes:
an accumulation section such as a management server for accumulating distribution information to be distributed to the terminal device;
a second determination section such as a management server for determining, based on a state signal transmitted from the terminal device, whether the terminal device is ready for receiving the distribution information after the information transmission enabled state is established between the terminal device and the agent module; and
a distribution section such as a management server for distributing the distribution information when it is determined that the terminal device is ready for receiving the distribution information, and the terminal device includes:
a state signal transmission section such as a CPU for transmitting to the agent module the state signal indicating whether the terminal device is ready for receiving the distribution information; and
an distribution information reception section such as a line interface for receiving the distribution information, which is distributed.

With this arrangement, after the information transmission enabled state has been established between the terminal device and the agent module, a check is performed to determine whether the terminal device is ready for receiving the distribution information and it is ascertained that the terminal device is ready, the distribution information is distributed. Therefore, even when no operator is present at the terminal device, the agent module can distribute the distribution information.

Furthermore, according to a sixth aspect of the invention, there is provided the network system according to the first aspect of the invention, wherein the agent module includes:
an update information accumulation section such as a management server for accumulating update information used to update a function of information processing apparatus connected to the terminal device; and
an update information transmission section such as a management server for transmitting the update information to the terminal device after the information transmission enabled state is established between the terminal device and the agent module, and the terminal device includes:
an update information reception section such as a line interface for receiving the update information; and
an update section such as a CPU for utilizing the update information to update the function of the information processing apparatus.

With this arrangement, after the information transmission enabled state has been established between the terminal device and the agent module, the agent module transmits the update information to the terminal device and the terminal device utilizes this update information to update the function of the information processing apparatus. Even when no operator is present at the terminal device, the update information received from the agent module can be distributed and can be used to update the function of the information processing apparatus.

According to a seventh aspect of the invention, there is provided the network system according to the first aspect of the invention, wherein the agent module includes:
a failure signal reception section such as a management server for receiving a failure signal, when the failure signal indicating that an information processing apparatus connected to the terminal device has a breakdown is transmitted from the terminal device; and
a result signal transmission section such as a management server for diagnosing a failure state of the information processing apparatus based on the failure signal to transmit diagnostic result information to the terminal device after the failure signal is received and the information transmission enabled state is established between the terminal device and the agent module, and the terminal device further includes:
a failure signal transmission section such as a line interface for transmitting to the agent module the failure signal indicating that the information processing apparatus has a breakdown;
a result signal reception section such as a line interface for receiving the diagnostic result information; and
a failure processing section such as a CPU for performing a process for the information processing apparatus having a breakdown based on the diagnostic result information.

With this arrangement, after a failure signal has been received from the terminal device and the information transmission enabled state has been established between the terminal device and the agent module, the agent module utilizes the failure signal to diagnose the failure state of the information processing apparatus and transmits the diagnostic result information to the terminal device. Further, the terminal device performs for the information processing apparatus having a breakdown based on the received diagnostic result information. Therefore, even when no operator is present at the terminal device, the diagnostic result information transmitted by the agent module can be distributed and can be used to cope with the failure of the information processing apparatus.

According to an eighth aspect of the invention, there is provided an agent module comprising a request signal transmission section for transmitting to a terminal device a request signal requesting to establish an information transmission enabled state between the agent module and the terminal device, the request signal including identification information to identify the agent module.

With this arrangement, when the agent module transmits a request signal to the terminal device and it is ascertained that the pertinent agent module is the one to which the terminal device should be connected, the information transmission enabled state is established between the terminal device and the agent module that has transmitted the request signal. Therefore, even when no operator is present at the terminal device, information can be transmitted between the terminal device and the information processing apparatus connected thereto and the agent module can control various processes for the terminal device.

According to a ninth aspect of the invention, there is provided a terminal device comprising:

a reception section for receiving a request signal, a determination section for determining whether an agent module which has transmitted the request signal is an agent module to which the terminal device receiving the request signal is to be connected; and an establishment section for establishing an information transmission enabled state between the terminal device receiving the request signal and the agent module which has transmitted the request signal, when the determination section ascertains that the agent module which has transmitted the request signal is the agent module to which the terminal device receiving the request signal is to be connected.

With this arrangement, when a request signal is transmitted from the agent module to the terminal device and it is ascertained that this agent module is the one to which the terminal device should be connected, the information transmission enabled state is established between the agent module that has transmitted the request signal and the terminal device. Therefore, even when no operator is present at the terminal device, information can be transmitted between the terminal device and the information processing apparatus connected thereto and the agent module can control various processes for the information processing apparatus.

Furthermore, according to a tenth aspect of the invention, there is provided a network operation method comprising the steps of:

transmitting from an agent module to a terminal device a request signal requesting to establish an information transmission enabled state between the terminal device and the agent module, the request signal including identification information to identify the agent module;

determining whether the agent module is an agent module to which the terminal device is to be connected;

establishing the information transmission enabled state between the terminal device and the agent module, when it is determined that the agent module is the agent to which the terminal device is to be connected.

According to this arrangement, when the agent module transmits the request signal to the terminal device and the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

Further, according to an eleventh aspect of the invention, there is provided the network operation method according to the tenth aspect of the invention, further comprising the steps of:

identifying whether another terminal device other than the terminal data is another authorized terminal device that is to be connected to the agent module, when transmitting a request for a connection from the another terminal device; and connecting the terminal device and the another terminal device after the establishing step, wherein the request signal transmitting step is performed to establish the information transmission enabled state, when it is identified, in the identifying step, that the another terminal device is the another authorized terminal device that is to be connected to the agent module.

According to this arrangement, when another terminal device other than the terminal device that is connected to the agent module issues a connection request to the terminal device, the connection to the terminal device is established through the agent module. Therefore, even when no operator is present at the terminal device connected to the agent module, information can be exchanged by the another terminal device and the terminal device connected to the agent module.

According to a twelfth aspect of the invention, there is provided the network operation method according to the eleventh aspect of the invention, further comprising the steps of:

remotely controlling a information processing apparatus connected to the terminal device;

performing a process for the remotely controlling step after the connection step.

With this arrangement, when another terminal device is connected through the agent module to the terminal device connected to the agent module, the another terminal device performs remote control of the terminal device connected to the agent module. Therefore, even when no operator is present at the terminal device connected to the agent module, the another terminal can remotely control the information processing apparatus connected to the terminal device that is connected in turn to the agent module.

According to a thirteenth aspect of the invention, there is provided the network operation method according to the twelfth aspect of the invention, further comprising the steps of recording information in a recording medium.

With this arrangement, the another terminal device performs a process for the remotely control for setting at least setting a time from which the information processing apparatus performs a process for recording information. Therefore, even when no operator is present at the terminal device connected to the agent module, the another terminal device remotely controls the information processing apparatus connected to the terminal device that is connected in turn to the agent module, to perform the recording process.

According to a fourteenth aspect of the invention, there is provided the network operation method according to the tenth aspect of the invention, further comprising the steps of:

accumulating distribution information to be distributed to the terminal device;

transmitting a state signal from the terminal device to the agent module after the establishing step;

determining whether the terminal device is ready for receiving the distribution information based on the state signal; and distributing the distribution information from the agent module to the terminal device, when it is determined that the terminal device is ready for receiving the distribution information.

With this arrangement, after the information transmission enabled state has been established between the terminal device and the agent module, a check is performed to determine whether the terminal device is ready for receiving the distribution information, and it is ascertained that the terminal device is ready, the distribution information is distributed. Therefore, even when no operator is present at the terminal device, the agent module can distribute the distribution information.

Furthermore, according to a fifteenth aspect of the invention, there is provided the network operation method according to the tenth aspect of the invention, further comprising the steps of:

accumulating update information used to update a function of information processing apparatus connected to the terminal device;

transmitting the update information from the agent module to the terminal device after the establishing step; and updating the function of the information processing apparatus by using the update information.

With this arrangement, after the information transmission enabled state has been established between the terminal device and the agent module, the agent module transmits the update information to the terminal device and the terminal device utilizes this update information to update the function of the information processing apparatus. Even when no operator is present at the terminal device, the update information received from the agent module can be distributed and can be used to update the function of the information processing apparatus.

According to a sixteenth aspect of the invention, there is provided the network operation method according to the tenth aspect of the invention, further comprising the steps of:

transmitting a failure signal indicating that information processing apparatus connected to the terminal device has a breakdown from the terminal device to the agent device, when the information processing apparatus has a breakdown;

diagnosing a failure state of the information processing apparatus based on the failure signal based on the failure signal after the establishing step;

transmitting a diagnostic result information from the agent module to the terminal device; and performing a process for the information processing apparatus having a breakdown based on the diagnostic result information.

With this arrangement, when a failure signal has been received from the terminal device and the information transmission enabled state has been established between the terminal device and the agent module, the agent module utilizes the failure signal to diagnose the failure of the information processing apparatus and transmits the diagnostic result information that is thus obtained to the terminal device. Further, the terminal device performs processing for the information processing apparatus having a breakdown based on the received diagnostic result information. Therefore, even when no operator is present at the terminal device, the diagnostic result information transmitted by the agent module can be distributed and can be used to cope with the failure of the information processing apparatus.

To achieve the objective of the present invention, according to a seventeenth aspect of the invention, there is provided an information recording medium in which an agent program is stored in a readable form for a computer, the agent program comprising the steps of transmitting from an agent module to a terminal device a request signal requesting to establish an information transmission enabled state between the terminal device and the agent module, the request signal including identification information to identify the agent module.

According to this arrangement, the agent computer functions so that the agent module transmits the request signal to the terminal device. Therefore, when the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

To achieve the objective of the invention, according to an eighteenth aspect of the invention, there is provided an information recording medium in which a terminal processing program is stored in a readable form for a computer, the terminal processing program comprising the steps of:

receiving a request signal transmitted from an agent module to a terminal device, the request signal used to establish an information transmission enabled state between the terminal device and the agent module, the request signal including identification information to identify the agent module;

determining whether the agent module is an agent module to which the terminal device is to be connected based on the identification signal;

establishing the information transmission enabled state between the terminal device and the agent module, when it is determined that the agent module is the agent module to which the terminal device is to be connected.

According to this arrangement, the terminal computer functions so that the agent module transmits the request signal to the terminal device and that when the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

To achieve the objective of the present invention, according to a nineteenth aspect of the invention, there is provided an agent program comprising the steps of transmitting from an agent module to a terminal device a request signal requesting to establish an information transmission enabled state between the terminal device and the agent module, the request signal including identification information to identify the agent module.

According to this arrangement, the agent computer functions so that the agent module transmits the request signal to the terminal device. Therefore, when the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

To achieve the objective of the invention, according to a twentieth aspect of the invention, there is provided a terminal processing program comprising the steps of:

receiving a request signal transmitted from an agent module to a terminal device, the request signal used to establish an information transmission enabled state between the terminal device and the agent module, the request signal including identification information to identify the agent module;

determining whether the agent module is an agent module to which the terminal device is to be connected based on the identification signal;

establishing the information transmission enabled state between the terminal device and the agent module, when it is determined that the agent module is the agent module to which the terminal device is to be connected.

According to this arrangement, the terminal computer functions, so that the agent module transmits the request signal to the terminal device and that when the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

DETAILED DESCRIPTION OF THE PREFERRED EMBODIMENT

The preferred embodiment of the present invention will now be described with reference to the accompanying drawings.

Each of embodiments on which description will be given hereinbelow is an embodiment to which the invention is applied when in a network system including a network having a wired or wireless connection such as Internet, an agent module interposed between a connection terminal and the net work as a terminal device to be connected to other computer or the like via the network, the agent module for relaying connection from the connection terminal to a network, and a house in which the connection terminal is disposed, the connection terminal and devices connected to the connected terminal is operated by remote control.

(I) General Configuration

The configuration and operation of a network system used in common for each embodiment will now be described with reference to FIG. 1.

Figure 1:
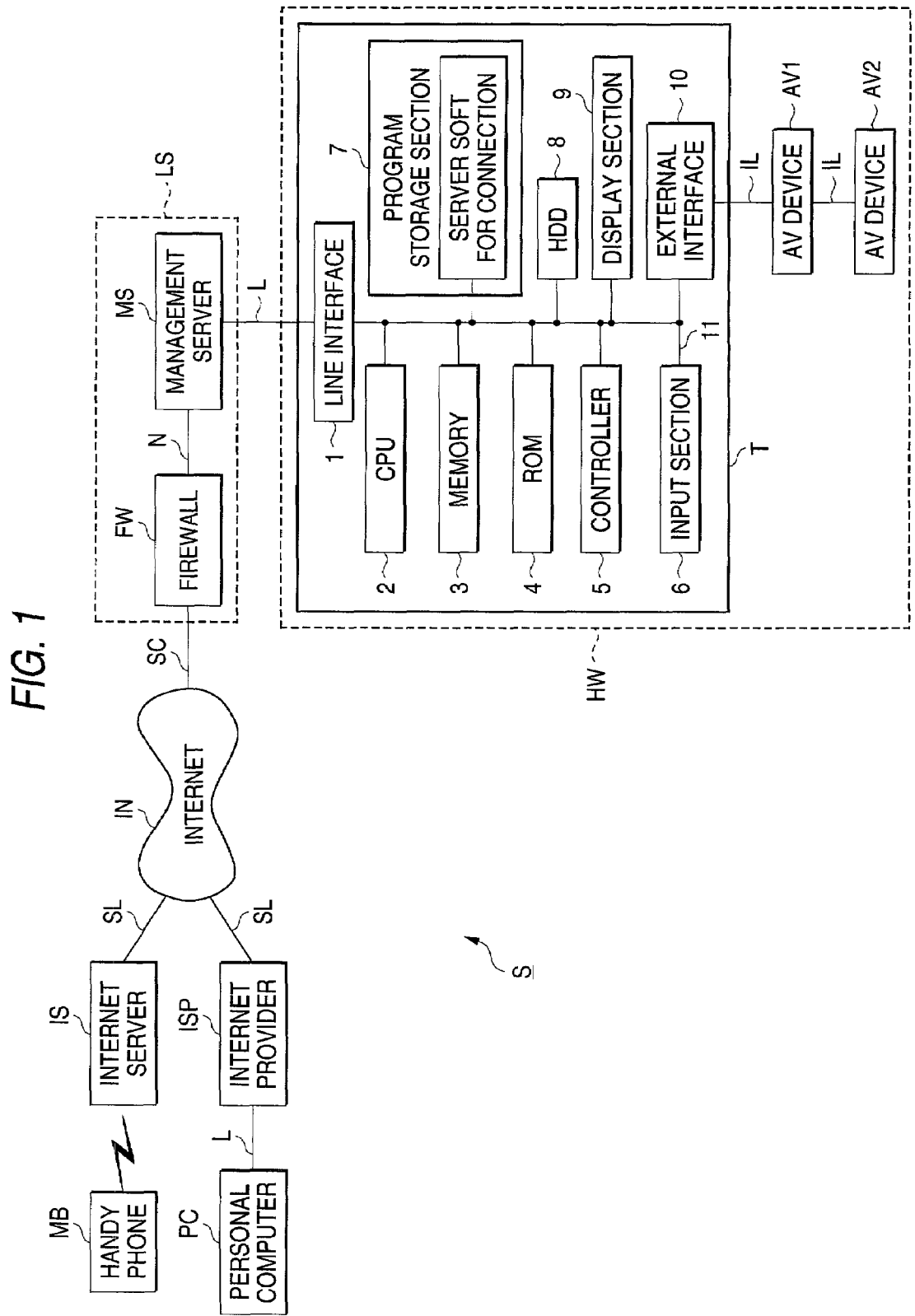
FIG. 1 is a schematic block diagram showing the configuration of a network system according to one embodiment of the present invention.

FIG. 1 is a block diagram showing the general configuration of the network system.

As is shown in FIG. 1, a network system S for each embodiment comprises: a handy phone MB, which is to be connected via radio communication to an Internet server IS owned by a handy phone company; a personal computer PC, which is connected through a telephone line L to a Internet provider ISP for Internet IN owned by a service provider; the Internet server IS and the Internet provider ISP, which are connected to the Internet IN along private lines SL, respectively; the Internet IN; an agent server LS, which is connected as an agent module to the Internet IN through a private line SC; a connection terminal T, which is connected to the agent server LS through a telephone line L; and AV (Audio Visual) devices AV1 and AV2, which are connected to the connection terminal T in serial through a serial bus IL.

The connection terminal T and the AV devices AV1 and AV2 are installed in the same house HW, while the personal computer PC is installed in an office where the owner of the connection terminal T is employed and the handy phone MB is carried by the owner.

The agent server LS is connected to the Internet IN through the private line SC, and comprises: a firewall FW for preventing unauthorized information or computer viruses from entering the agent server LS via the Internet IN, for determining whether a user who requests an Internet IN connection is an authorized user, and for verifying and storing information that is permitted to pass through the firewall FW and is fetched by the agent server LS; and a management server MS, which is connected to the firewall FW through a network N such as a local area network and to the connection terminal T through the telephone line L, which, as the agent server LS described later, provides total management processing control, and which serves as a request signal transmission section, an identification section, a connection section, a storage section, a determination section, distribution section, an update information storage section, an update information transmission section, a failure signal reception section and a result signal transmission section.

The connection terminal T includes: a line interface 1 for connecting the connection terminal T itself to the agent server LS through the telephone line L, the line interface serving as a reception section, a distribution information reception section, an update information reception section, a failure signal transmission section and a result signal reception section; a CPU 2 for controlling all processing described later as connection terminal T, the CPU 2 serving as a determination section, an establishment section, a state signal transmission section, an update section and a failure processing section; a volatile memory 3 for temporarily storing information required for the processing; a nonvolatile ROM (Read Only Memory) 4 for storing a control program required for the processing and the like; a controller 5 for supporting the CPU 2 to control each of components in the connection terminal T; an input section 6 such as a keyboard that is used to input information to the connection terminal T; a program storage unit 7 in which a connection server program (software) for executing process in relation to an embodiment described later is stored in readable state; a hard disk drive 8, which includes a nonvolatile hard disk on which a large amount of information required for the processing is recorded in readable state; a display unit 9 for displaying information required for the execution of the processing; and an external interface 10 for connecting the AV device AV1 to the connection terminal T through the serial bus IL. The components in the connection terminal T are interconnected through a bus 11 so that the components can transmit/receive information to/from each other.

In the house HW, the AV devices AV1 and AV2, which are audio systems or video systems, are connected to the connection terminal T through the serial bus IL.

The processing performed in the thus arranged network system S will now be described with reference to FIGS. 2 to 10.

(II) Embodiment of Initial Registration Processing

Now, with reference to FIG. 2, an explanation will be given on an initial registration processing to be performed when the owner of the connection terminal T purchases an AV device AV1 or AV2 that has to be connected to the connection terminal T to use.

Figure 2:
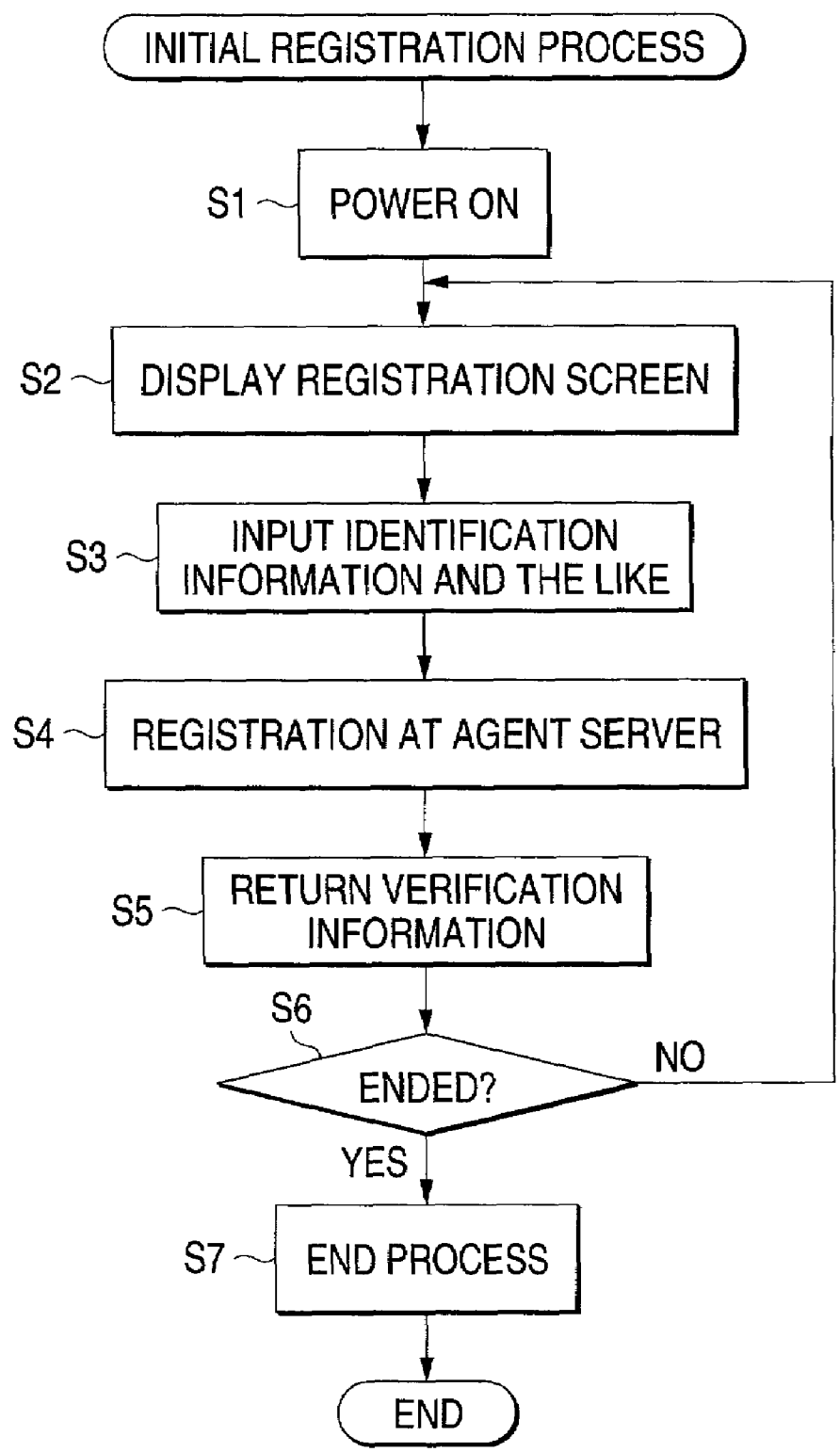
FIG. 2 is a flowchart for the initial registration processing performed for the embodiment.

FIG. 2 is a flowchart of the initial registration processing.

The following initial registration processing is performed after the AV device AV1 or AV2 has been purchased. This processing is required so that the agent server LS will perform, for the AV device AV1 or AV2, failure diagnostic processing or automatic updating processing, both of which will be described later.

As is shown in FIG. 2, for the initial registration processing, first, either the AV device AV1 or AV2 that has been purchased is connected to the connection terminal T via the serial bus IL, and the connection terminal T is connected to the agent server LS through the telephone line L. Further, power is supplied to the AV device AV1 or AV2 to be initially registered (hereinafter referred to as a registration target device if necessary) (step S1).

Then, a registration screen, which is set up in advance to perform the initial registration, is displayed on a display unit (not shown) of the registration target device (step S2). Following this, identification information such as a serial number which is peculiar to the registration target device and a password that the agent server LS uses to identify this device are set on the registration screen. Further, a telephone number, which corresponds to the terminal T in which the registration target device is installed, and a credit card number, which is used when payment for the failure diagnosis fee is made, are inputted to the registration screen (step S3).

After these data have been inputted, the registration target device is connected through the connection terminal T and the telephone line L to the agent server LS in which the registration target device is to be registered and the input data are transmitted to the agent server LS. In this manner, the initial registration processing is performed (step S4).

Next, acknowledgement information, indicating that the registration contents transmitted at step S4 have been confirmed, is returned by the agent server LS (step S5). After this acknowledgement information has been written to the registration target device, the diagnostic failure processing or the like becomes executable.

A check is then performed to determine whether the initial registration processing has been normally performed (step S6). When the processing has not been normally completed (NO at step S6), the processing returns to step S2, and the processing is repeated. When the processing has been normally completed (YES at step S6), an end process such as the disconnection from the agent server LS through the telephone line L is performed (step S7). The initial registration processing according to this embodiment is terminated.

(III) Embodiment of Automatic Connection Processing

Figure 3:
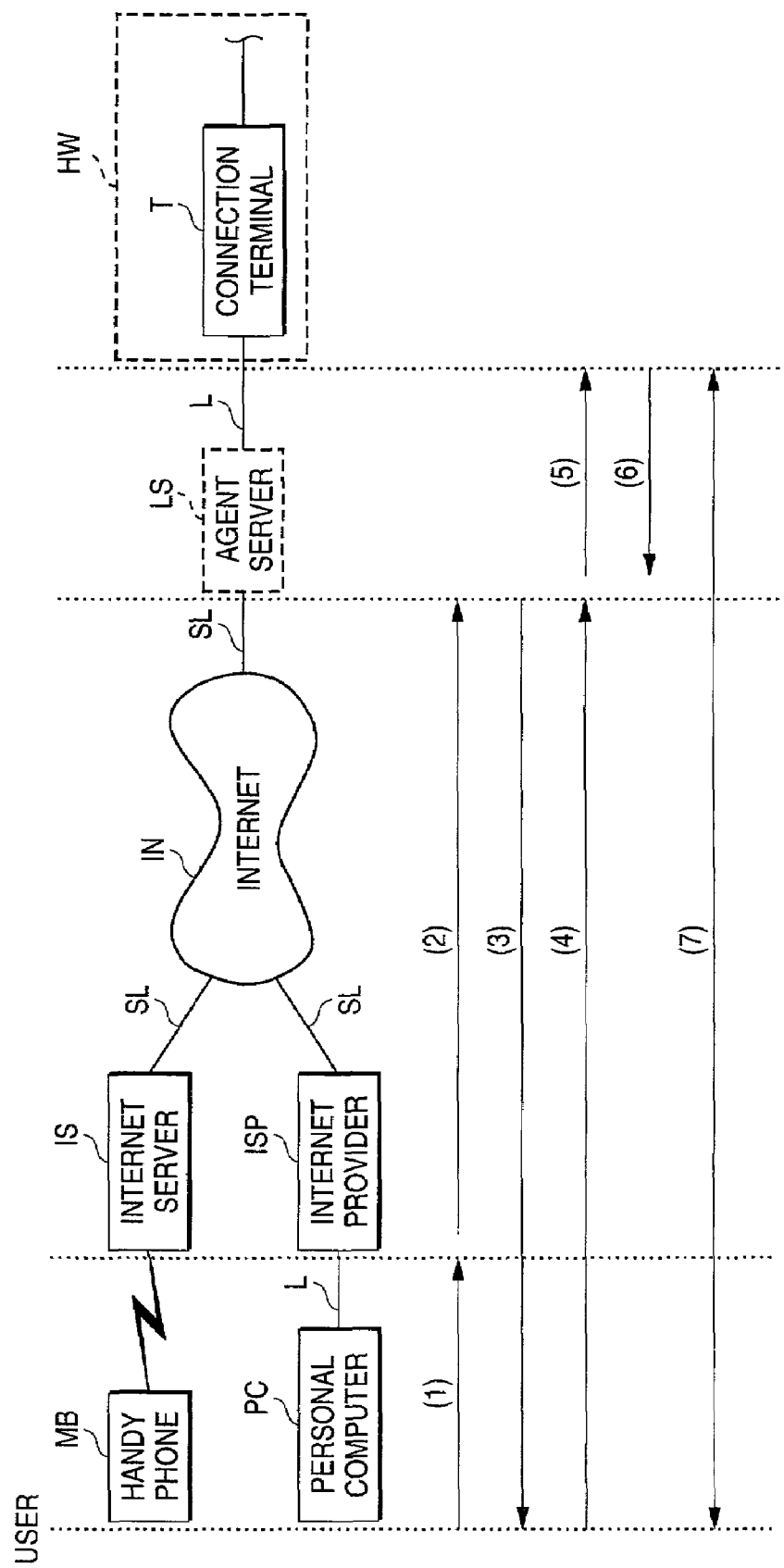
FIG. 3 is a diagram showing the automatic connection procedures for the embodiment.
Figure 4:
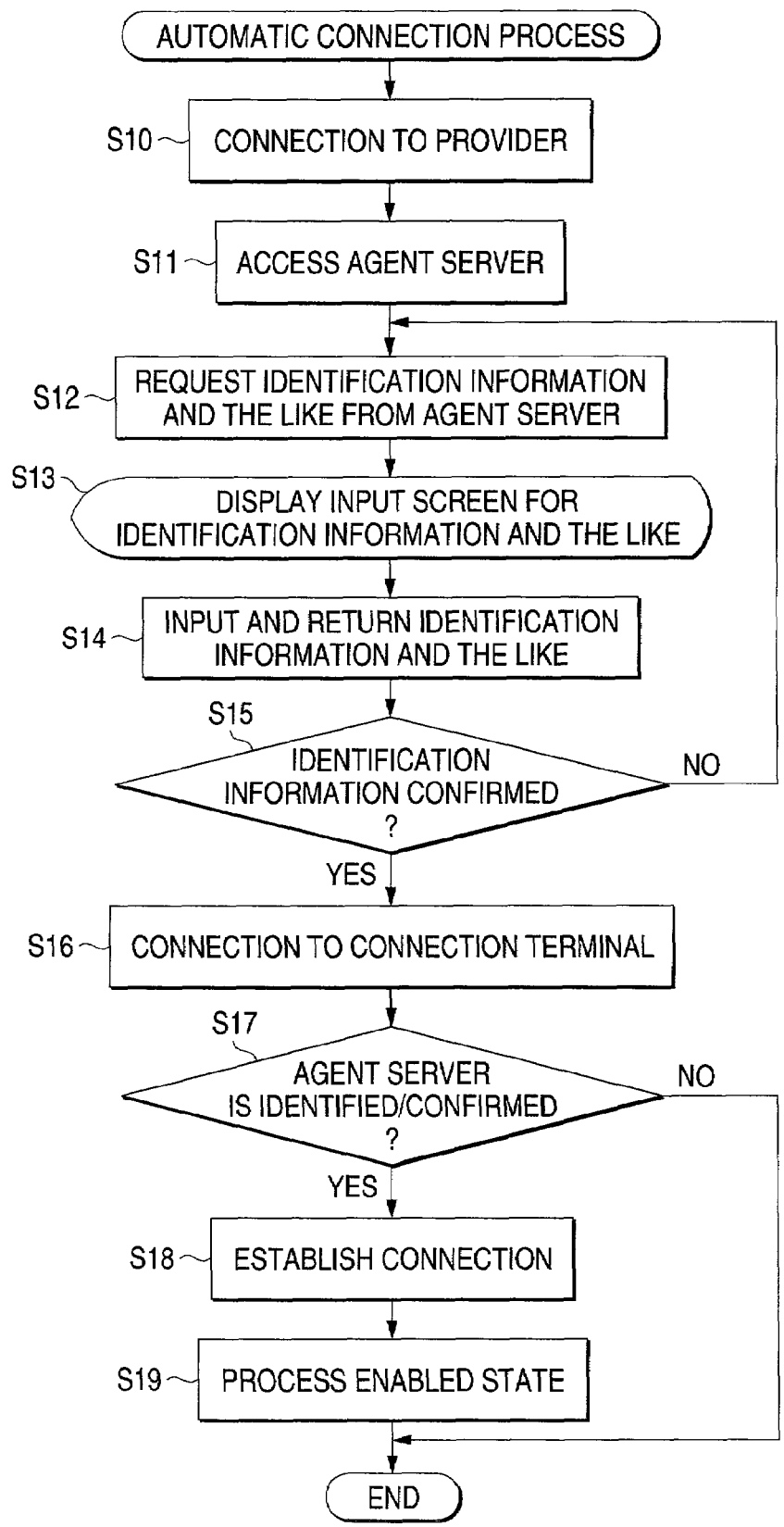
FIG. 4 is a flowchart for the automatic connection processing performed for the embodiment.

With reference to FIGS. 3 and 4, an explanation will now be given on an embodiment of the automatic connection processing in which when a user is absent from the house HW, the user operating the handy phone MB or the personal computer PC (hereinafter referred to simply as the handy phone MB) can employ the handy phone MB to access the connection terminal T via the Internet IN and to operate the AV device AV1 or the like that is connected to the connection terminal T.

FIG. 3 is a schematic diagram showing procedures (order of process) for an automatic connection and FIG. 4 is a flowchart showing the automatic connection processing.

As is shown in FIG. 4, in the automatic connection processing according to this embodiment, first, the user employs the handy phone MB or the like to connect to the Internet server IS or the Internet provider ISP through the radio wave or the telephone line L (step S10; see (1) in FIG. 3).

When a connection to the Internet server IS or to the Internet provider ISP is established, the handy phone MB or the like accesses the agent server LS via the Internet IN (step S11; see (2) in FIG. 3).

Upon the reception of an access request, the agent server LS issues to the handy phone MB a request for an entry of the identification information and the password that were used for the initial registration processing to confirm whether the user who has accessed is the user of the AV device AV1 who has been registered in advance (step S12; see (3) in FIG. 3).

Next, following the reception of the request for the identification information and the password, an input screen for the entry of the data is displayed on the display unit (not shown) of the handy phone MB (step 13). The user then uses the input screen to enters the identification information and the password that were used for the initial registration, and transmits the contents of the screen to the agent server LS via the Internet IN (step S14; see (4) in FIG. 3).

The agent server LS compares the received identification information and the like with the identification information and password that were used for the initial registration to confirm whether they coincide with each other (step S15). If they do not coincident with each other (NO at step S15), the agent server LS concludes that the user who is making the current access is not an authorized user and the process sequence beginning at step S12 is repeated to again request the entry of the identification information and the password. If this time they coincident with each other on the identification information and the passwords (YES at step S15), the handy phone MB is connected in telephone through the telephone line L to a telephone number of the connection terminal T that was registered at the time of the initial registration and information indicating that a connection is requested and identification information indicating the agent server LS are transmitted to the connection terminal T (step S16; see (5) in FIG. 3).

Upon receiving a call, the connection terminal T, based on the identification information that is provided, employs a well known authentication technique to determine whether the agent server LS that made the call is an authorized agent server LS to which the connection terminal T should be connected (step S17). Then, if the authentication process fails (NO at step S17), the connection terminal T concludes that an unauthorized connection request has been issued by an unauthorized agent server, and the automatic connection processing is terminated. If, however, a positive authentication result is obtained (YES at step S17), the connection terminal T concludes that the call and the connection request were issued by an authorized agent server LS and executes a processing for connecting to the handy phone MB through the agent server LS between the connection terminal and the agent server LS. (step S18; see (6) in FIG. 3).

Thereafter, in the agent server LS, the handy phone MB connected in the steps S14 and S15 and the connection terminal T connected in the step 18 are connected to each other to establish connection between the handy phone MB and the connection terminal T. Whereby the AV device AV1 or the like is operable from the handy phone MB (step S19; see (7) in FIG. 3). Following this, the automatic connection processing according to this embodiment is terminated.

(IV) Embodiment of Automatic Reservation Processing

Now, with reference to FIGS. 5 to 7, an explanation will be given on an embodiment of the automatic reservation processing for reserving recording operation of the AV device AV1 or AV2 from the handy phone MB when the AV1 or AV2 connected to the connection terminal T functions as an information recording apparatus that can record image information or the like, as one of the remote control processes which is performed in a state where the handy phone MB and the connection terminal T are connected by the above described automatic connection processing.

Figure 5:
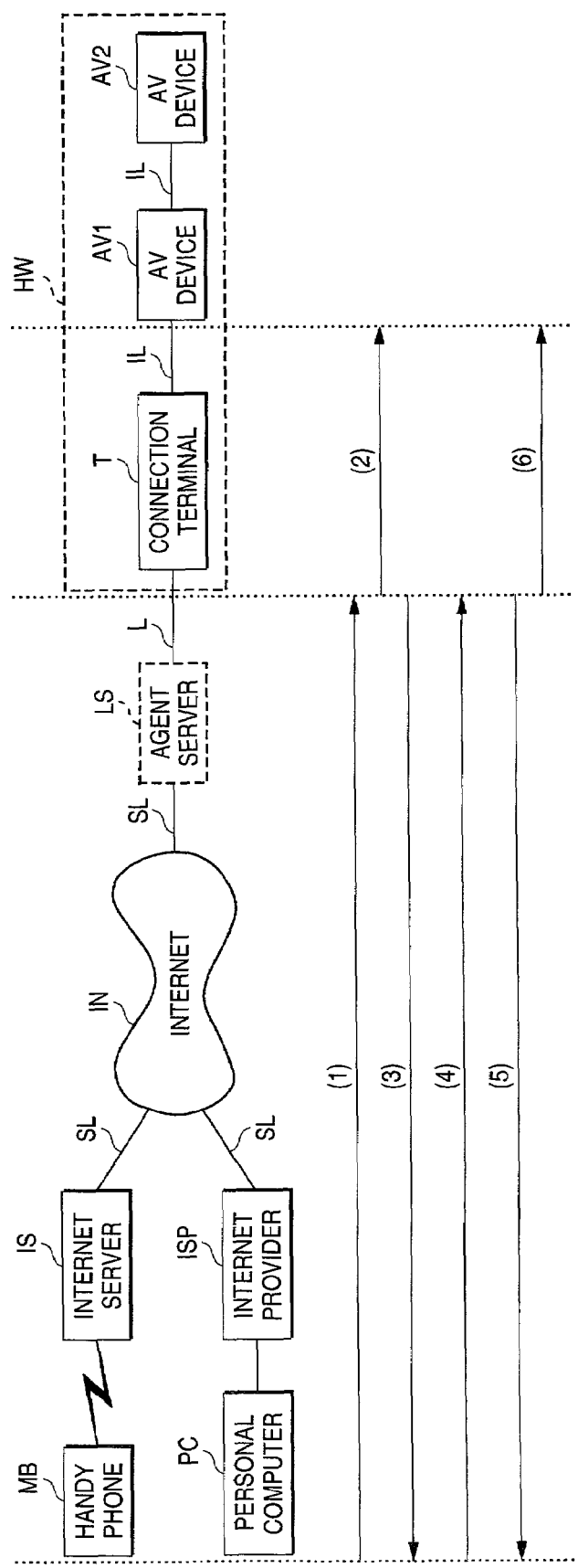
FIG. 5 is a diagram showing the automatic reservation procedures for the embodiment.
Figure 6:
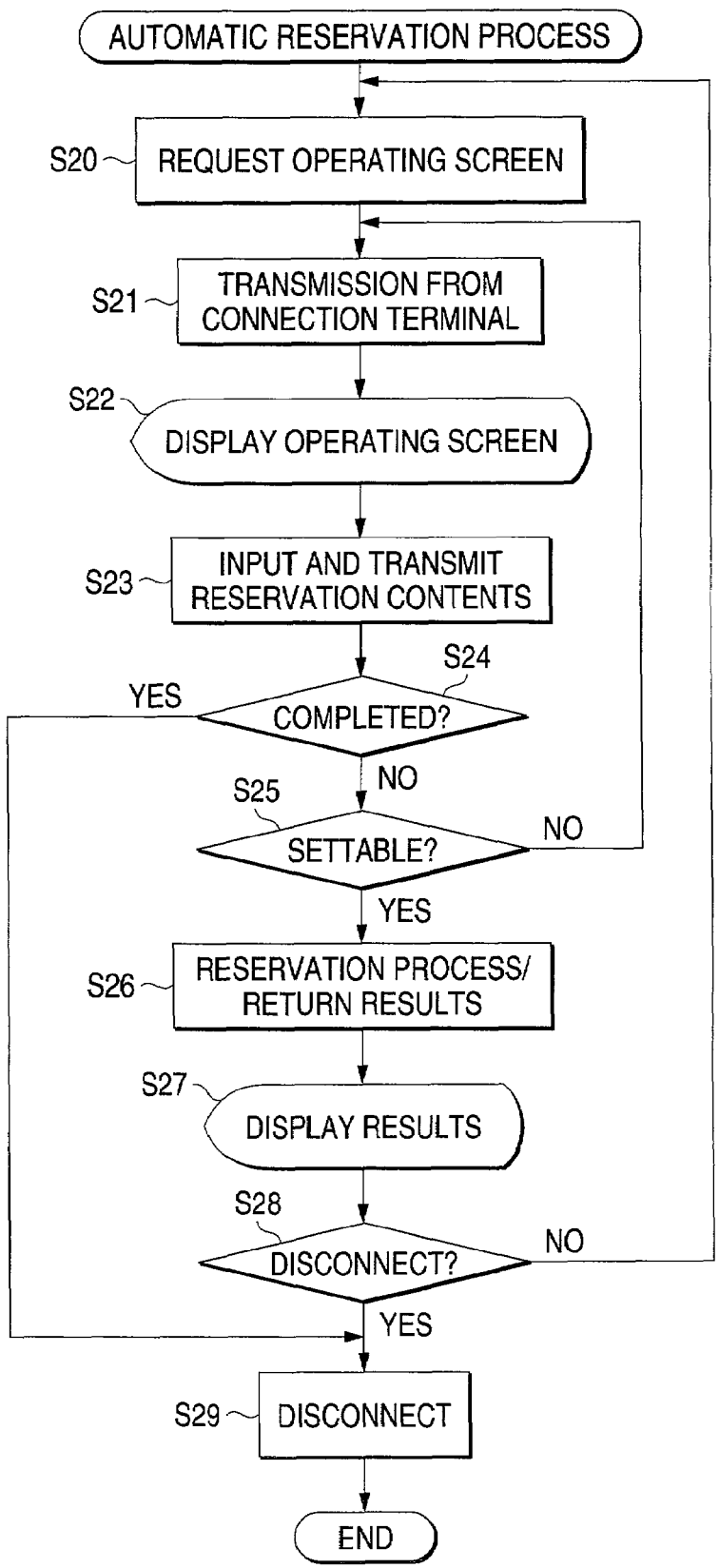
FIG. 6 is a flowchart showing the automatic reservation processing performed for the embodiment.

FIG. 5 is a schematic diagram illustrating the automatic reservation procedures (an order of processing), FIG. 6 is a flowchart showing the automatic reservation processing, and FIG. 7 is a diagram showing an example of a display screen used in the automatic reservation processing.

As is shown in FIG. 5, first, in the automatic reservation process of this embodiment, the previously described automatic connection processing is performed and the handy phone MB and the terminal MB are remotely connected.

Then, the handy phone MB requests that the connection terminal T provide an input operation screen for the automatic reservation processing (step S20; see (1) in FIG. 5).

Upon receiving the request, the connection terminal T confirms operating state (whether or not remote control is enabled) of each device connected to the connection terminal T (see (2) in FIG. 5) and extracts a device which is in the remote control enabled state. The connection terminal T then creates a selection screen indicating this device (i.e., a screen with which the user operating the handy phone MB or the like selects a device to be remote-controlled, for example, a selection screen G1 shown in FIG. 7A), and transmits the screen to the handy phone MB (step S21).

Figure 7A:
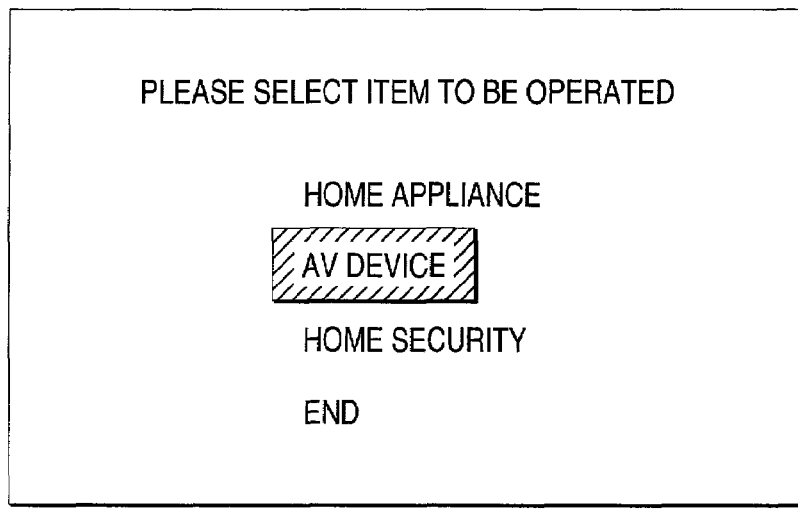
FIG. 7A is a diagram showing an example screen (I) displayed during the automatic reservation processing performed for the embodiment.
Figure 7B:
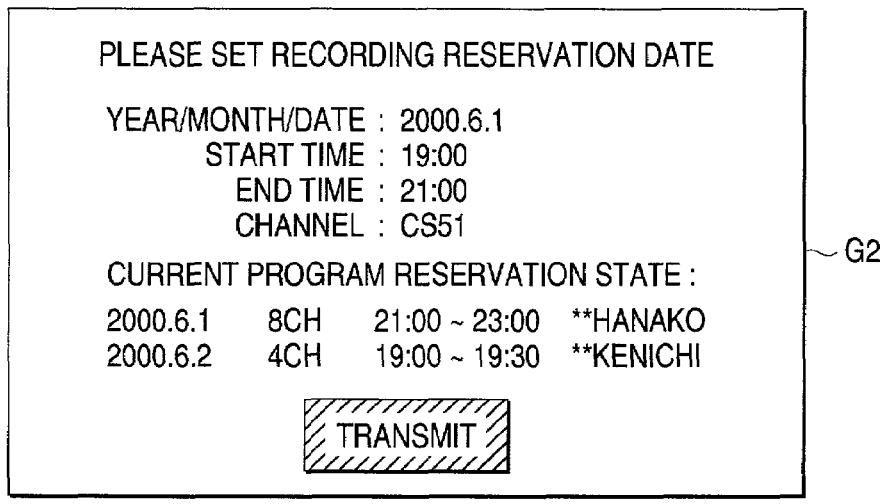
FIG. 7B is a diagram showing an example screen (II) displayed during the automatic reservation processing performed for the embodiment.
Figure 7C:
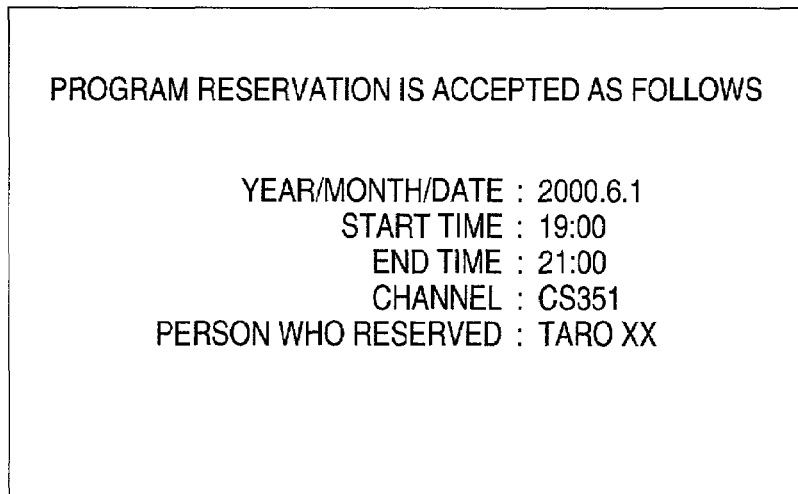
FIG. 7C is a diagram showing an example screen (III) displayed during the automatic reservation processing performed for the embodiment.

When the user operating the handy phone MB selects a device to be a target of the automatic reservation processing based on the received selection screen, identification information indicating the selected device is transmitted to the connection terminal T. In response, the connection terminal T transmits to the handy phone MB or the like current reservation condition of the selected device. As a result, a reservation condition screen, such as a condition screen G2 in FIG. 7B, is displayed on the display section (not shown) of the handy phone MB (step S22).

The user operating the handy phone MB or the like then uses the reservation condition screen to enter required reservation information (see FIG. 7B) and transmits the reservation information to the connection terminal T (step S23; see (4) in FIG. 5).

Next, a check is performed to determine whether all the reservation information has been transmitted to the connection terminal T (step S24). When all the reservation information has been transmitted (YES at step S24), the process is shifted to step S29, which will be described later. On the other hand, when all the reservation information has not been transmitted (NO at step S24), the connection terminal T confirms whether the AV device AV1 or AV2 has been transmitted information as the reservation information, which can perform the reservation process (step S25). When the reservation information does not include only the information which can perform the reservation process (NO at step S25), the process returns to the step S21. Then, the connection terminal T retransmits to the handy phone MB the reservation state screen for entering the correct reservation information.

When in the determination at the step S25, the reservation information includes only the information which can perform the reservation process (YES at step S25), the connection terminal T completes the reception of the reservation information and transmits to the handy phone MB complete information indicating that information reception has been completed (see (5) in FIG. 5). Subsequently, the connection terminal T employs the received reservation information to perform the reservation process for the AV device AV1 or AV2 (see (6) in FIG. 5) and then transmits to the handy phone MB result information indicating the reservation process results together with a display screen such as the result display screen G3 shown in FIG. 7C (step S26). The result display screen is thereafter displayed on the handy phone MB (step S27). Using the screen, the user operating the handy phone MB can confirm that the automatic reservation processing has been completed.

The connection terminal T then confirms whether information indicating that the connection between the connection terminal and the handy phone MB is deleted because the automatic reservation process has been completed has been received from the handy phone MB (step S28). When this information has not yet been received (NO at step S28), it is assumed that the automatic reservation process is continued, the process returns to step S20, and the previously described processing sequence is repeated. On the other hand, if information indicating that the automatic reservation process has been completed has been transmitted (YES at step S28), the current connection is deleted (step S29) and the automatic reservation processing is thereafter terminated.

(V) Embodiment of Automatic Distribution Processing

Figure 8:
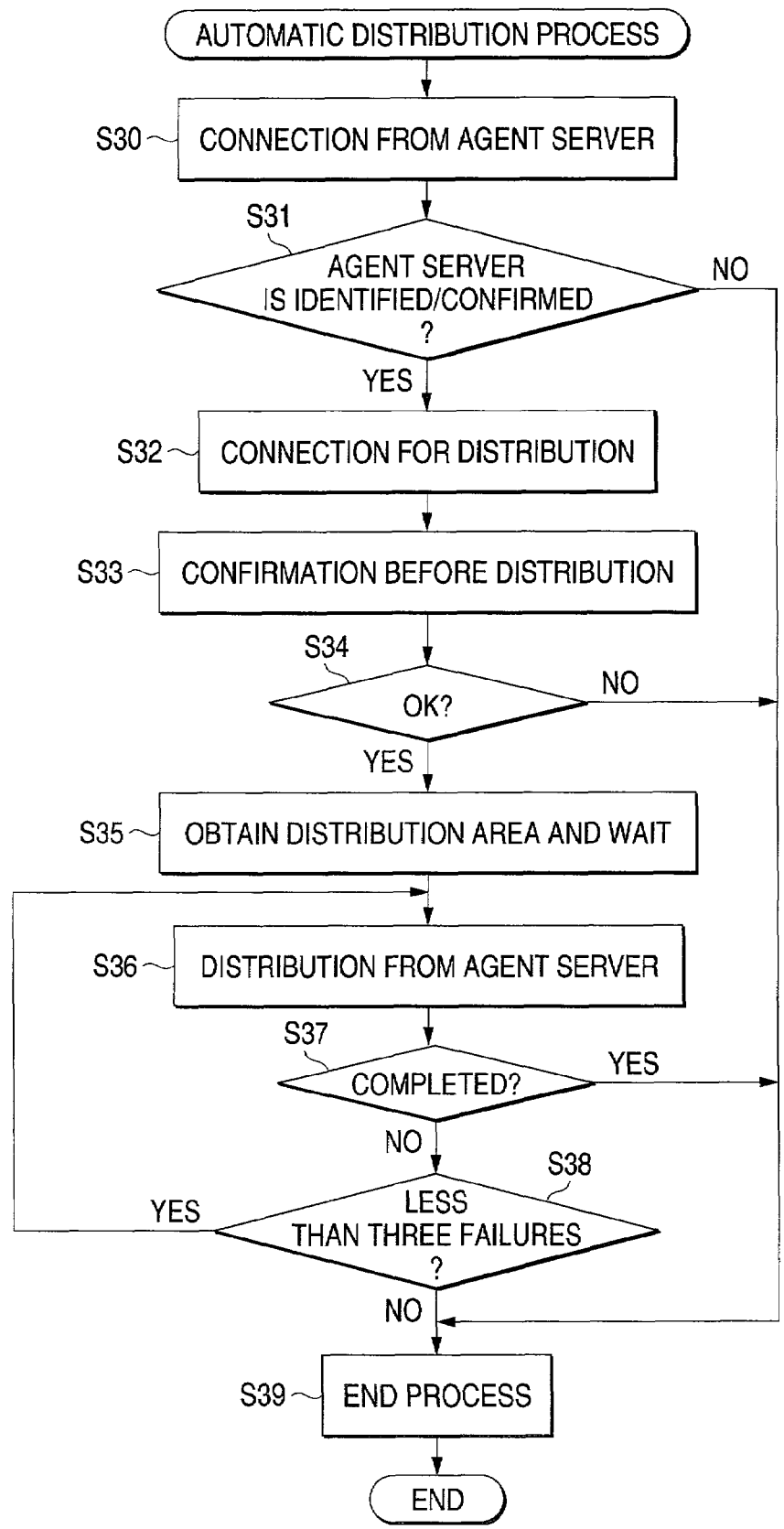
FIG. 8 is a flowchart for the automatic distribution processing performed for the embodiment.

With reference to FIG. 8, an explanation will now be given on an embodiment of automatic distribution processing for automatically distributing image information to be accumulated in the connection terminal T from the agent server LS to the connection terminal T (even if a user operating the connection terminal T itself is absent from the house HW) when the connection terminal T has a function as an information accumulating device which can accumulate the image information and the like and the AV device AV1 or AV2 connected to the connection terminal T has a function as information record device which can record the image information, as a process example performed between the agent server LS and the connection terminal T when the agent server LS and the connection terminal T are connectable to each other. FIG. 8 is a flowchart showing the automatic distribution processing.

As is shown in FIG. 8, in the automatic distribution processing of this embodiment, first, the agent server LS uses the telephone line L to perform telephone connection to the connection terminal T and then transmits to the connection terminal T information indicating a connection request together with identification information indicating the agent server LS (step S30).

Upon receiving the call, the connection terminal T, based on the identification information, employs a well known authentication technique to determine whether the agent server that has placed the call is an authorized agent server to which the connection terminal T should be connected (step S31). If the authentication process fails (NO at step S31), the connection terminal T concludes that an unauthorized connection request has been issued by an unauthorized agent server and the process is shifted to step S39, which will be described later. If, however, a positive authentication result is obtained (YES at step S31), the connection terminal T concludes that the call was placed by an authorized agent server and performs, between the agent server LS and the connection terminal T, the connection process to the agent server LS (step S32).

When the connection between the agent server LS and the connection terminal T has been established, the agent server LS confirms whether or not the connection terminal T can accumulate the image information (more specifically, whether or not the connection terminal T can obtain a recording area in which the image information can be accumulated and whether or not the accumulation of the image information is permitted by the connection terminal T) (steps S33 and S34).

When it is determined at the step S34 that the accumulation is not permitted (NO at step S34), the distribution processing that will be described below can not be performed, and the process is shifted to step S39, which will be described later. If the accumulation is permitted (YES at step S34), the connection terminal T releases the recording area for storing the image information and waits to receive distribution from the agent server LS (step S35).

The agent server LS starts the distribution of the image information or the like (step S36).

It is confirmed whether or not all the image information has been distributed (step S37). When the distribution process has been completed (YES at step S37), the process is shifted to step S39, which will be described later. On the other hand, when the distribution process has not been completed (NO at step S37), it is confirmed whether or not the distribution process has failed (step S38). When the distribution process has failed and the failure less than three times in succession have occurred (YES at step S38), the process is shifted to step S36 to restart the distribution process. If, however, failures not less than three times in succession have occurred (NO at step S38), it is assumed that the connection between the agent server LS and the connection terminal T is not satisfactory due to a specific barrier and an end process for terminating the automatic distribution process is performed (step S39). The automatic distribution process sequence is thereafter terminated.

Specifically, when the process shifts to the end process after the distribution of the image information has been completed (YES at step S37), the telephone communication between the agent server LS and the connection terminal T is disconnected and the automatic distribution processing is terminated. If, however, the agent server LS is not normally verified by the connection terminal T (NO at step S31), if the recording area for storing the image information can not be secured at the connection terminal T (NO at step S34), or if the failures not less than three times in succession have occurred (NO at step S38), the distribution of the image information is incomplete, and thus a message indicating that the distribution is incomplete is displayed on the display section 9 of the connection terminal T and the agent server LS side later makes contact with the user owning the connection terminal T to communicate that the distribution is incomplete.

When the distribution to the connection terminal T has been normally completed, following the end process in FIG. 8, a process for recording the distributed and recorded image information in the AV device AV1 or AV2 is performed in the house HW.

(VI) Embodiment of Automatic Update Processing

Figure 9:
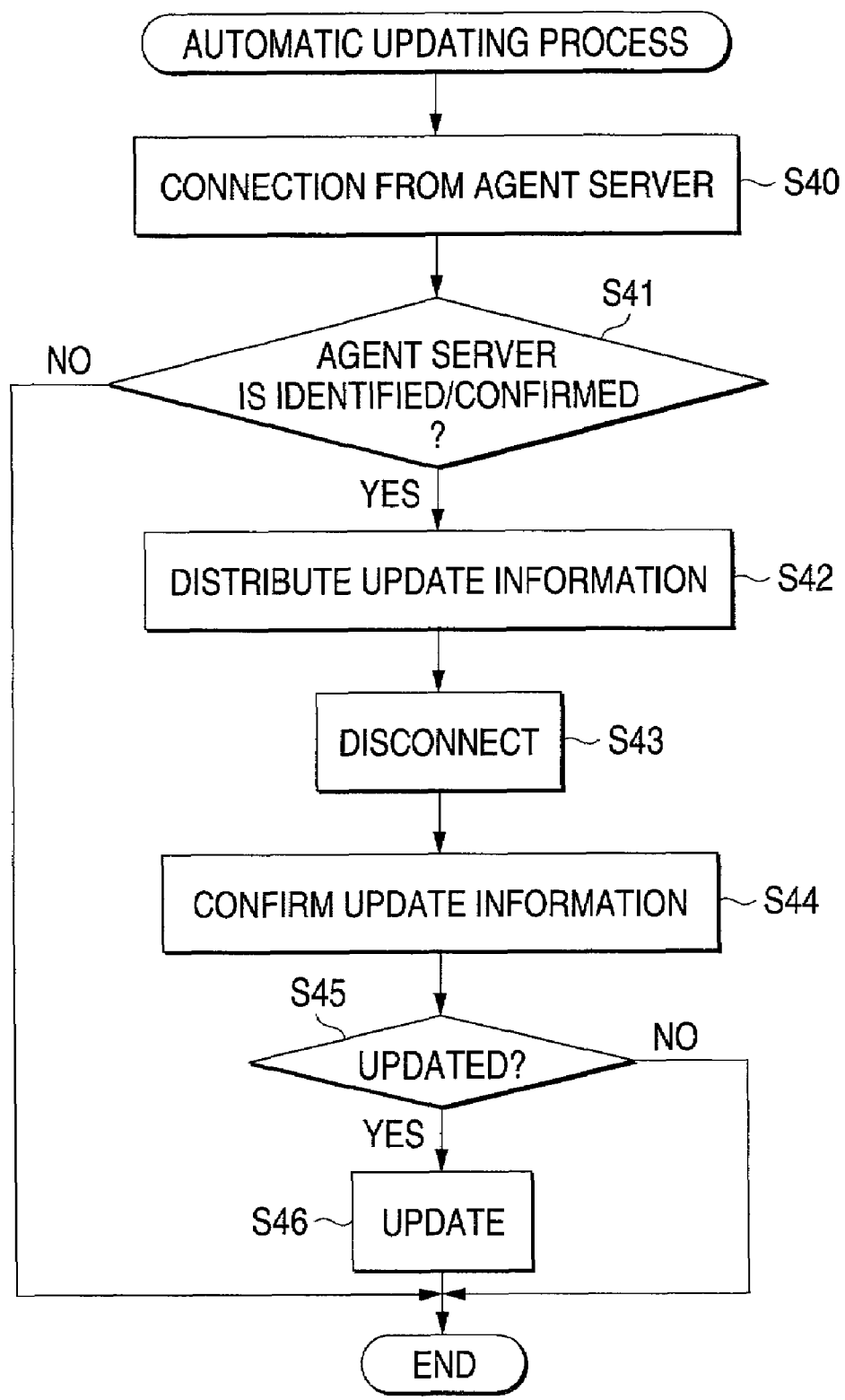
FIG. 9 is a flowchart for the automatic update processing performed for the embodiment.

With reference to FIG. 9, as another example of processing performed between the agent server LS and the connection terminal T when the agent server LS and the connection terminal T are connectable to each other, an explanation will now be given on an embodiment of the automatic update processing for automatically updating functions of the AV device AV1 or AV2 connected to the connection terminal T, through the connection terminal T from the agent server LS (even if the user operating the AV device AV1 or AV2 and the connection terminal itself is absent from the house HW). FIG. 9 is a flowchart showing the automatic update processing.

As shown in FIG. 9, in the automatic update processing of this embodiment, first, the agent server LS perform telephone communication to the connection terminal T and transmits to the connection terminal T information indicating a connection request together with identification information indicating the agent server LS (step S40).

Upon receiving the call, the connection terminal T employs a well known authentication technique based on the received identification information to determine whether or not the agent server LS that has placed the call is an authorized agent server LS to which the connection terminal T should be connected (step S41). If the authentication process fails (NO at step S41), it is assumed that an unauthorized server has issued an unauthorized connection request to the connection terminal T, and the automatic update processing is terminated. If, however, a positive authentication result is obtained (YES at step S41), it is assumed that an authorized agent server LS placed the call and the connection terminal T performs, between the agent server LS and the connection terminal T, a process for establishing a connection with the agent server LS. Further, the agent server LS thereafter distributes to the connection terminal T update information for updating the functions of the AV device AV1 or AV2 (step S42). Thereafter, the agent server LS and the connection terminal T are disconnected.

The connection terminal T and the AV device AV1 or AV2 confirm the contents of the distributed update information by displaying (step S44). It is determined in accordance with the result of confirmation whether or not updating the current functions by using the update information (step S45). When the current functions are not to be updated (NO at step S45), the processing is terminated. When, however, the update information is to be used to update the current functions (YES at step S45), the update process is performed (step S46). The automatic update processing is thereafter terminated.

(VII) Embodiment of Failure Diagnostic Processing

Figure 10:
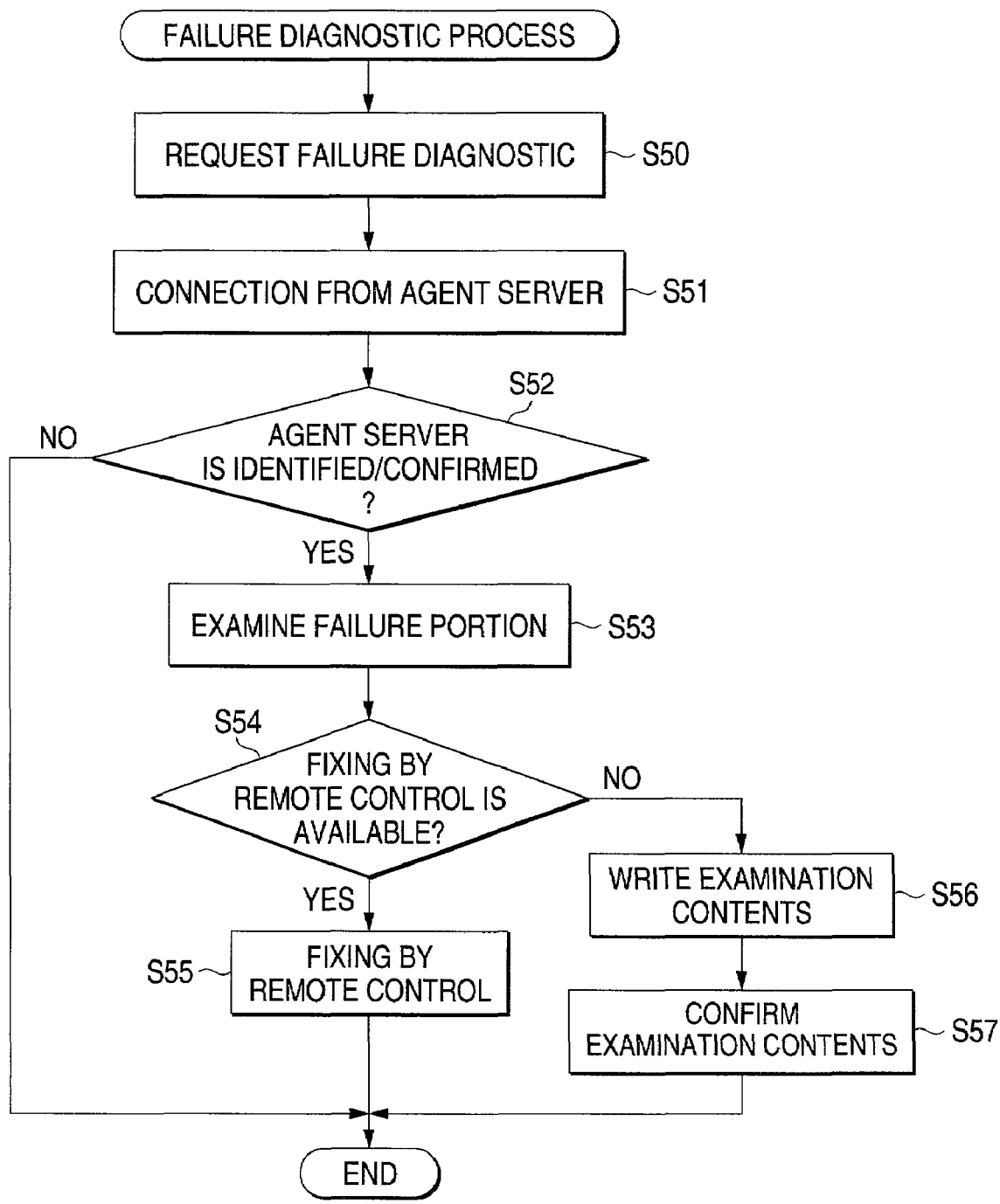
FIG. 10 is a flowchart for the failure diagnostic processing performed for the embodiment.

With reference to FIG. 10, as further another example of a process performed between the agent server LS and the connection terminal T when the agent server LS and the connection terminal T are connectable to each other, an explanation will now be given on an embodiment of the failure diagnostic processing for performing the failure diagnostic processing for the AV device AV1 or AV2 connected to the connection terminal T, from the agent server LS through the connection terminal T. FIG. 10 is a flowchart showing the failure diagnostic processing.

As shown in FIG. 10, in the failure diagnostic processing of this embodiment, when the AV device AV1 or AV2 issues a request via the connection terminal T to the agent server LS to diagnose a failure (step S50), the agent server LS perform telephone connection to the connection terminal T and transmits to the connection terminal T information indicating a connection request together with identification information indicating the agent server LS (step S51).

Upon receiving the call, the connection terminal T employs a well known authentication technique based on the identification information to determine whether or not the agent server LS that placed the call is an authorized server LS to which the connection terminal T should be connected (step S52). If the authentication process fails (NO at step S52), it is concluded that an unauthorized server has issued an unauthorized connection request to the connection terminal T and the failure diagnostic processing is terminated. If, however, a positive authentication result is obtained (YES at step S52), the connection terminal T concludes that an authorized agent server LS placed the call and performs, between the connection terminal T and the agent server LS, a process for establishing a connection with the agent server LS. Further, through the remote control performed by the agent server LS, an examination of the AV device AV1 or AV2 failure is performed (step S53).

Based on the examination results, it is determined whether or not a failure that can be fixed by remote control has been found (step S54). When a failure that can be fixed by remote control has been found (YES at step S54), based on the examination results, the failure is fixed by remote control (step S55). The failure diagnostic processing is thereafter terminated.

On the other hand, when, at step S54, a failure that can not be fixed by remote control is found (NO at step S54), the contents of the failure are stored in the recording area of the AV device AV1 or AV2 having a failure portion (step S56).

The recorded failure contents are displayed and confirmed by operating the AV device AV1 or AV2 having the failure portion (step S57). The failure diagnostic processing is thereafter terminated.

When the failure diagnostic processing is terminated after step S57, i.e., when a failure that can not be fixed by remote control is found, based on the contents of the failure confirmed at step S57, a failure fixing request or the like is performed later by the user of the AV device AV1 or AV2.

As is described above, according to the processes performed in the network system S in each of embodiments, when an agent server LS transmits connection request information to a connection terminal T and the connection terminal T concludes that the agent server LS that has transmitted the connection request information is one agent server LS to which the connection terminal T should be connected, a connection is established between the connection terminal T and the agent server LS that has transmitted the connection request information. Therefore, even when no operator is present at the connection terminal T, information can be transmitted/received by the connection terminal T and the AV device AV1 connected thereto.

Further, when a handy phone MB or the like has issued the connection request to the connection terminal T, the connection with the connection terminal T is established through the agent server LS. Therefore, even when no operator is present at the connection terminal T connected to the agent server LS, information can be transmitted/received between the handy phone MB or the like and the connection terminal T.

Furthermore, when the handy phone MB or the like is connected to the connection terminal T via the agent server LS, the handy phone MB or the like can perform a process for remote control. Therefore, even when no operator is present at the connection terminal T connected to the agent server LS, the handy phone MB or the like can perform remote control of the AV device AV1 or AV2 connected to the connection terminal T.

In addition, the handy phone MB or the like can perform remote control to, at the least, set a time for starting the recording process of information in the AV device AV1 or AV2. Therefore, even when no operator is present at the connection terminal T, the handy phone MB or the like can perform remote control of recording process in the AV device AV1 or AV2 connected to the connection terminal T.

After a connection is established between a connection terminal T and an agent server LS, it is determined whether or not the connection terminal T is ready for distribution of image information and when it is determined that the connection terminal T is ready, the distribution of the image information is begun. Therefore, even when no operator is present at the connection terminal T, image information can be distributed from the agent server LS.

In addition, after a connection is established between a connection terminal T and an agent server LS, update information is transmitted to the connection terminal T and the connection terminal T employs the received update information to update the functions of an AV device AV1 or AV2. Therefore, even when no operator is present at the terminal, update information can be distributed from the agent server LS and update the functions of the AV device AV1 or AV2 by using the update information.

Moreover, after a failure fixing is requested by a connection terminal T and a connection is established between the connection terminal T and an agent server LS, the agent server LS diagnoses the failure state of an AV device AV1 or AV2 in accordance with the failure correction request and transmits diagnostic result information to the connection terminal T and based on the received diagnostic result information, the fixing operation for the AV device AV1 or AV2 is performed. Therefore, even when no operator is present at the connection terminal T, the agent server LS can distribute the diagnostic result information and the diagnostic result information can be used to fix the failure that occurred in the AV device AV1 or AV2.

Programs corresponding to the flowcharts shown in FIGS. 2, 4, 6, 8, 9 and 10 may be recorded on an information storage medium such as a flexible disk, a hard disk, or the like and may be read and executed by a common micro computer, a personal computer, or the like so that the micro computer, the personal computer, or the like can function as either the agent server LS or the connection terminal T.

As is described above, according to the first aspect of the invention, when the agent module transmits the request signal to the terminal device, and when the terminal device ascertains that this agent module is one that the terminal device should be connected to, the information transmission enabled state is established between the terminal device the agent module that transmitted the request signal. Therefore, even when no operator is present at the terminal device, information can be exchanged by the terminal device and an information processing apparatus connected thereto.

Therefore, even when no operator is present at the location whereat the terminal is installed, the terminal and the information processing apparatus connected thereto can be controlled by the agent module.

According to the second aspect of the invention, in addition to the effects obtained for the first aspect, when another terminal device other than the terminal device that is connected to the agent module issues a connection request to the terminal device, the connection to the terminal device is established through the agent module. Therefore, even when no operator is present at the terminal device connected to the agent module, information can be exchanged between the another terminal device and the terminal device connected to the agent module.

According to the third aspect of the invention, in addition to the effects obtained for the second aspect, when another terminal device is connected through the agent module to the terminal device connected to the agent module, the another terminal device performs remote control of the terminal device connected to the agent module. Therefore, even when no operator is present at the terminal device connected to the agent module, the another terminal can remotely control the information processing apparatus connected to the terminal device that is connected in turn to the agent module.

According to the fourth aspect of the invention, in addition to the aspects obtained for the third aspect, the another terminal device performs the remote control for setting at least a time from which the information processing apparatus performs a process for recording information. Therefore, even when no operator is present at the terminal device connected to the agent module, the another terminal device remotely controls the recording process performed by the information processing apparatus connected to the terminal device that is connected in turn to the agent module.

According to the fifth aspect of the invention, in addition to the effects obtained for the first aspect, after the information transmission enabled state has been established between the terminal device and the agent module, a check is performed to determine whether the terminal device is ready for receiving the distribution information, and when it is ascertained that the terminal device is ready, the distribution information is distributed. Therefore, even when no operator is present at the terminal device, the agent module can distribute distribution information.

According to the sixth aspect of the invention, in addition to the effects obtained for the first aspect, after the information transmission enabled state has been established between the terminal device and the agent module, the agent module transmits the update information to the terminal device, and the terminal device utilizes this update information to update the function of the information processing apparatus. Even when no operator is present at the terminal device, the agent module can distribute the update information and the update information can be used to update the function of the information processing apparatus.

According to the seventh aspect of the invention, in addition to the effects obtained for the first aspect, when a failure signal has been received from the terminal device and when the information transmission enabled state has been established between the terminal device and the agent module, the agent module utilizes the failure signal to diagnose the failure of the information processing apparatus and transmits the diagnostic result information that is thus obtained to the terminal device. Further, the terminal device performs a processing for the information processing apparatus based on the received diagnostic result information. Therefore, even when no operator is present at the terminal device, the diagnostic result information transmitted by the agent module can be distributed and can be used to cope with the failure of the information processing apparatus.

According to the eighth aspect of the invention, when the agent module transmits a request signal to the terminal device, and when it is ascertained that the pertinent agent module is the one to which the terminal device should be connected, the information transmission enabled state is established relative to the agent module that has transmitted the request signal. Therefore, even when no operator is present at the terminal device, information can be exchanged by the terminal device and the information processing apparatus connected thereto and the agent module can control various processes for the terminal device.

According to the ninth aspect of the invention, when a request signal is transmitted by the agent module to the terminal device, and when it is ascertained that this agent module is the one to which the terminal device should be connected, the information transmission enabled state is established relative to the agent module that has transmitted the request signal. Therefore, even when no operator is present at the terminal device, information can be exchanged by the terminal device and the information processing apparatus connected thereto, and the agent module can control various processes for the information processing apparatus.

According to the tenth aspect of the invention, when the agent module transmits the request signal to the terminal device and the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

Therefore, even when no operator is present at the location at which the terminal is installed, the terminal and the information processing apparatus connected thereto can be controlled by the agent module.

According to the eleventh aspect of the invention, in addition to the effects obtained for the tenth aspect, when another terminal device other than the terminal device that is connected to the agent module issues a connection request to the terminal device, the connection to the terminal device is established through the agent module. Therefore, even when no operator is present at the terminal device connected to the agent module, information can be exchanged by the another terminal device and the terminal device connected to the agent module.

According to the twelfth aspect of the invention, in addition to the effects obtained for the eleventh aspect, when another terminal device is connected through the agent module to the terminal device connected to the agent module, the another terminal device performs remote control of the terminal device connected to the agent module. Therefore, even when no operator is present at the terminal device connected to the agent module, the another terminal can remotely control the information processing apparatus connected to the terminal device that is connected in turn to the agent module.

According to the thirteenth aspect of the invention, in addition to the aspects obtained for the twelfth aspect, the another terminal device performs a process for the remotely control for setting at least setting a time from which the information processing apparatus performs a process for recording information. Therefore, even when no operator is present at the terminal device connected to the agent module, the another terminal device remotely controls the information processing apparatus connected to the terminal device that is connected in turn to the agent module, to perform the recording process.

According to the fourteenth aspect of the invention, in addition to the effects obtained for the tenth aspect, after the information transmission enabled state has been established between the terminal device and the agent module, a check is performed to determine whether the terminal device is ready for receiving the distribution information, and it is ascertained that the terminal device is ready, the distribution information is distributed. Therefore, even when no operator is present at the terminal device, the agent module can distribute the distribution information.

According to the fifteenth aspect of the invention, after the information transmission enabled state has been established between the terminal device and the agent module, the agent module transmits the update information to the terminal device and the terminal device utilizes this update information to update the function of the information processing apparatus. Even when no operator is present at the terminal device, the update information received from the agent module can be distributed and can be used to update the function of the information processing apparatus.

According to the sixteenth aspect of the invention, when a failure signal has been received from the terminal device and the information transmission enabled state has been established between the terminal device and the agent module, the agent module utilizes the failure signal to diagnose the failure of the information processing apparatus and transmits the diagnostic result information that is thus obtained to the terminal device. Further, the terminal device performs processing for the information processing apparatus having a breakdown based on the received diagnostic result information. Therefore, even when no operator is present at the terminal device, the diagnostic result information transmitted by the agent module can be distributed and can be used to cope with the failure of the information processing apparatus.

According to the seventeenth aspect of the invention, the agent computer functions so that the agent module transmits the request signal to the terminal device. Therefore, when the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

Therefore, even when no operator is present at the location whereat the terminal is installed, the terminal and the information processing apparatus connected thereto can be controlled by the agent module.

According to the eighteenth aspect of the invention, the terminal computer functions so that the agent module transmits the request signal to the terminal device and that when the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

Therefore, even when no operator is present at the location whereat the terminal is installed, the terminal and the information processing apparatus connected thereto can be controlled by the agent module.

According to the nineteenth aspect of the invention, the agent computer functions so that the agent module transmits the request signal to the terminal device. Therefore, when the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

Therefore, even when no operator is present at the location whereat the terminal is installed, the terminal and the information processing apparatus connected thereto can be controlled by the agent module.

According to the twentieth aspect of the invention, the terminal computer functions, so that the agent module transmits the request signal to the terminal device and that when the terminal device ascertains that this agent module is one that the terminal device should be connected to, the information transmission enabled state is established between the terminal device and the agent module that transmitted the request signal. Therefore, even when no operator is present at the terminal device, information can be exchanged by the terminal device and an information processing apparatus connected thereto.

Therefore, even when no operator is present at the location whereat the terminal is installed, the terminal and the information processing apparatus connected thereto can be controlled by the agent module.

What is claimed is:

1. A network system for connecting a plurality of terminal devices via an agent module, comprising:
   one of the terminal devices; and
   the agent module disposed between a network and the one of the terminal devices, for relaying an access from the one of the terminal devices to the network,
   wherein the agent module includes a request signal transmission section for transmitting to the one of the terminal devices a request signal requesting to initiate and establish an information transmission enabled state between the one of the terminal devices and the agent module, the request signal including identification information to identify the agent module; and
   the one of the terminal devices includes:
      a reception section for receiving the transmitted request signal,
      a first determination section for determining whether the agent module which has transmitted the request signal is an agent module to which the one of the terminal devices receiving the request signal is to be connected; and
      an establishment section for establishing the information transmission enabled state between the one of the terminal devices receiving the request signal and the agent module which has transmitted the request signal, when the first determination section ascertains that the agent module which has transmitted the request signal is the agent module to which the one of the terminal devices receiving the request signal is to be connected, wherein the agent module includes:
an accumulation section for accumulating distribution information to be distributed to the one of the terminal devices;
a second determination section for determining, based on a state signal transmitted from the one of the terminal devices, whether the one of the terminal devices is ready for receiving the distribution information after the information transmission enabled state is established between the one of the terminal devices and the agent module; and
a distribution section for distributing the distribution information when it is determined that the one of the terminal devices is ready for receiving the distribution information, and the one of the terminal devices includes:
a state signal transmission section for transmitting to the agent module the state signal indicating whether the one of the terminal devices is ready for receiving the distribution information; and
an distribution information reception section for receiving the distribution information, which is distributed.

2. The network system according to claim 1, wherein the agent module includes:
an identification section for identifying whether another of the terminal devices other than the one of the terminal devices is another authorized terminal device that is to be connected to the agent module, when the another of the terminal devices issues to the network a request for a connection to the one of the terminal devices to be connected to the network through the agent module;
a connection section for connecting the one of the terminal devices and the another of the terminal devices after the information transmission enabled state is established between the agent module and the one of the terminal devices; and
when the identification section ascertains that the another of the terminal devices is the another authorized terminal device to be connected to the agent module, the request transmission section outputs the request signal to the one of the terminal devices to establish the information transmission enabled state.

3. The network system according to claim 2,
wherein the another of the terminal devices is used to remotely control an information processing apparatus connected to the one of the terminal devices; and
when the another of the terminal devices and the one of the terminal devices are connected by the connection section, the another of the terminal devices performs a processing for the remote control.

4. The network system according to claim 3,
wherein the information processing apparatus is an information recording apparatus for recording information in a recording medium; and
the another of the terminal devices performs the remote control to set at least a time from which the information recording apparatus starts a process for recording the information.

5. A network system for connecting a plurality of terminal devices via an agent module, comprising:
one of the terminal devices; and
the agent module disposed between a network and the one of the terminal devices, for relaying an access from the one of the terminal devices to the network,
wherein the agent module includes a request signal transmission section for transmitting to the one of the terminal devices a request signal requesting to initiate and establish an information transmission enabled state between the one of the terminal devices and the agent module, the request signal including identification information to identify the agent module; and
the one of the terminal devices includes:
a reception section for receiving the transmitted request signal,
a first determination section for determining whether the agent module which has transmitted the request signal is an agent module to which the one of the terminal devices receiving the request signal is to be connected; and
an establishment section for establishing the information transmission enabled state between the one of the terminal devices receiving the request signal and the agent module which has transmitted the request signal, when the first determination section ascertains that the agent module which has transmitted the request signal is the agent module to which the one of the terminal devices receiving the request signal is to be connected,
wherein the agent module includes:
an update information accumulation section for accumulating update information used to update a function of an information processing apparatus connected to the one of the terminal devices; and
an update information transmission section for transmitting the update information to the one of the terminal devices after the information transmission enabled state is established between the one of the terminal devices and the agent module, and the one of the terminal devices includes:
an update information reception section for receiving the update information; and
an update section for utilizing the update information to update the function of the information processing apparatus.

6. The network system according to claim 5, wherein the agent module includes:
an identification section for identifying whether another of the terminal devices other than the one of the terminal devices is another authorized terminal device that is to be connected to the agent module, when the another of the terminal devices issues to the network a request for a connection to the one of the terminal devices to be connected to the network through the agent module;
a connection section for connecting the one of the terminal devices and the another of the terminal devices after the information transmission enabled state is established between the agent module and the one of the terminal devices; and
when the identification section ascertains that the another of the terminal devices is the another authorized terminal device to be connected to the agent module, the request transmission section outputs the request signal to the one of the terminal devices to establish the information transmission enabled state.

7. The network system according to claim 6, wherein the another of the terminal devices is used to remotely control an information processing apparatus connected to the one of the terminal devices; and when the another of the terminal devices and the one of the terminal devices are connected by the connection section, the another of the terminal devices performs a processing for the remote control.

8. A network system for connecting a plurality of terminal devices via an agent module, comprising:

one of the terminal devices; and the agent module disposed between a network and the one of the terminal devices, for relaying an access from the one of the terminal devices to the network, wherein the agent module includes a request signal transmission section for transmitting to the one of the terminal devices a request signal requesting to initiate and establish an information transmission enabled state between the one of the terminal devices and the agent module, the request signal including identification information to identify the agent module; and the one of the terminal devices includes:

a reception section for receiving the transmitted request signal, a first determination section for determining whether the agent module which has transmitted the request signal is an agent module to which the one of the terminal devices receiving the request signal is to be connected; and an establishment section for establishing the information transmission enabled state between the one of the terminal devices receiving the request signal and the agent module which has transmitted the request signal, when the first determination section ascertains that the agent module which has transmitted the request signal is the agent module to which the one of the terminal devices receiving the request signal is to be connected, wherein the agent module includes:

a failure signal reception section for receiving a failure signal, when the failure signal indicating that an information processing apparatus connected to the one of the terminal devices has a breakdown is transmitted from the one of the terminal devices; and a result signal transmission section for diagnosing a failure state of the information processing apparatus based on the failure signal to transmit diagnostic result information to the one of the terminal devices after the failure signal is received and the information transmission enabled state is established between the one of the terminal devices and the agent module, and the one of the terminal devices further includes:

a failure signal transmission section for transmitting to the agent module the failure signal indicating that the information processing apparatus has a breakdown;

a result signal reception section for receiving the diagnostic result information; and a failure processing section for performing a process for the information processing apparatus having a breakdown based on the diagnostic result information.

9. The network system according to claim 8, wherein the agent module includes:

an identification section for identifying whether another of the terminal devices other than the one of the terminal devices is another authorized terminal device that is to be connected to the agent module, when the another of the terminal devices issues to the network a request for a connection to the one of the terminal devices to be connected to the network through the agent module;

a connection section for connecting the one of the terminal devices and the another of the terminal devices after the information transmission enabled state is established between the agent module and the one of the terminal devices; and when the identification section ascertains that the another of the terminal devices is the another authorized terminal device to be connected to the agent module, the request transmission section outputs the request signal to the one of the terminal devices to establish the information transmission enabled state.

10. The network system according to claim 9, wherein the another of the terminal devices is used to remotely control an information processing apparatus connected to the one of the terminal devices; and when the another of the terminal devices and the one of the terminal devices are connected by the connection section, the another of the terminal devices performs a processing for the remote control.

11. A network operation method for connecting a plurality of terminal devices via an agent module, comprising the steps of:

transmitting from the agent module to one of the terminal devices a request signal requesting to initiate and establish an information transmission enabled state between the one of the terminal devices and the agent module, the request signal including identification information to identify the agent module;

determining whether the agent module is an agent module to which the one of the terminal devices is to be connected;

establishing the information transmission enabled state between the one of the terminal devices and the agent module, when it is determined that the agent module is the agent to which the one of the terminal devices is to be connected, wherein the network operation method further comprises the steps of:

accumulating distribution information to be distributed to the one of the terminal devices;

transmitting a state signal from the one of the terminal devices to the agent module after the establishing step;

determining whether the one of the terminal devices is ready for receiving the distribution information based on the state signal; and distributing the distribution information from the agent module to the one of the terminal devices, when it is determined that the one of the terminal devices is ready for receiving the distribution information.

12. The network operation method according to claim 11, further comprising the steps of:

identifying whether another of the terminal devices other than the one of the terminal devices is another authorized terminal device that is to be connected to the agent module, when transmitting a request for a connection from the another of the terminal devices; and connecting the one of the terminal devices and the another of the terminal devices after the establishing step, wherein the request signal transmitting step is performed to establish the information transmission enabled state, when it is identified, in the identifying step, that the another of the terminal devices is the another authorized terminal device that is to be connected to the agent module.

13. The network operation method according to claim 12, further comprising the steps of:
remotely controlling an information processing apparatus connected to the one of the terminal devices;
performing a process for the remotely controlling step after the connection step.

14. The network operation method according to claim 13, further comprising the steps of recording information in a recording medium.

15. A network operation method for connecting a plurality of terminal devices via an agent module, comprising the steps of:
transmitting from the agent module to one of the terminal devices a request signal requesting to initiate and establish an information transmission enabled state between the one of the terminal devices and the agent module, the request signal including identification information to identify the agent module;
determining whether the agent module is an agent module to which the one of the terminal devices is to be connected;
establishing the information transmission enabled state between the one of the terminal devices and the agent module, when it is determined that the agent module is the agent to which the one of the terminal devices is to be connected,
wherein the network operation method further comprises the steps of:
accumulating update information used to update a function of an information processing apparatus connected to the one of the terminal devices;
transmitting the update information from the agent module to the one of the terminal devices after the establishing step; and
updating the function of the information processing apparatus by using the update information.

16. The network operation method according to claim 15, further comprising the steps of:
identifying whether another of the terminal devices other than the one of the terminal devices is another authorized terminal device that is to be connected to the agent module, when transmitting a request for a connection from the another of the terminal devices; and
connecting the one of the terminal devices and the another of the terminal devices after the establishing step,
wherein the request signal transmitting step is performed to establish the information transmission enabled state, when it is identified, in the identifying step, that the another of the terminal devices is the another authorized terminal device that is to be connected to the agent module.

17. The network operation method according to claim 16, further comprising the steps of:
remotely controlling an information processing apparatus connected to the one of the terminal devices;
performing a process for the remotely controlling step after the connection step.

18. A network operation method for connecting a plurality of terminal devices via an agent module, comprising the steps of:
transmitting from the agent module to one of the terminal devices a request signal requesting to initiate and establish an information transmission enabled state between the one of the terminal devices and the agent module, the request signal including identification information to identify the agent module;
determining whether the agent module is an agent module to which the one of the terminal devices is to be connected;
establishing the information transmission enabled state between the one of the terminal devices and the agent module, when it is determined that the agent module is the agent to which the one of the terminal devices is to be connected,
wherein the network operation method further comprises the steps of:
transmitting a failure signal indicating that an information processing apparatus connected to the one of the terminal devices has a breakdown from the one of the terminal devices to the agent device, when the information processing apparatus has a breakdown;
diagnosing a failure state of the information processing apparatus based on the failure signal after the establishing step;
transmitting a diagnostic result information from the agent module to the one of the terminal devices; and
performing a process for the information processing apparatus having a breakdown based on the diagnostic result information.

19. The network operation method according to claim 18, further comprising the steps of:
identifying whether another of the terminal devices other than the one of the terminal devices is another authorized terminal device that is to be connected to the agent module, when transmitting a request for a connection from the another of the terminal devices; and
connecting the one of the terminal devices and the another of the terminal devices after the establishing step,
wherein the request signal transmitting step is performed to establish the information transmission enabled state, when it is identified, in the identifying step, that the another of the terminal devices is the another authorized terminal device that is to be connected to the agent module.

20. The network operation method according to claim 19, further comprising the steps of:
remotely controlling an information processing apparatus connected to the one of the terminal devices;
performing a process for the remotely controlling step after the connection step.

* * * * *